Aug. 19, 1952  J. SOLER ET AL  2,607,393
AUTOMOBILE TIRE RIM
Filed March 28, 1949
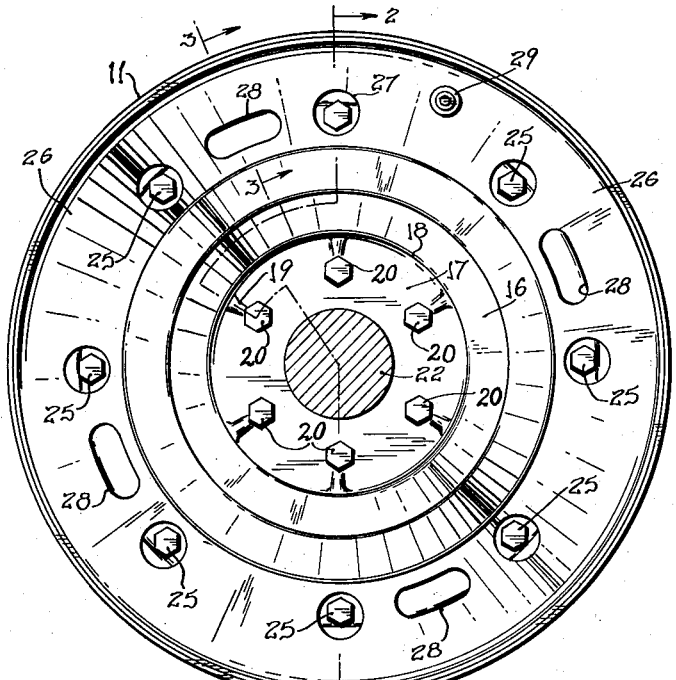
Fig. 1
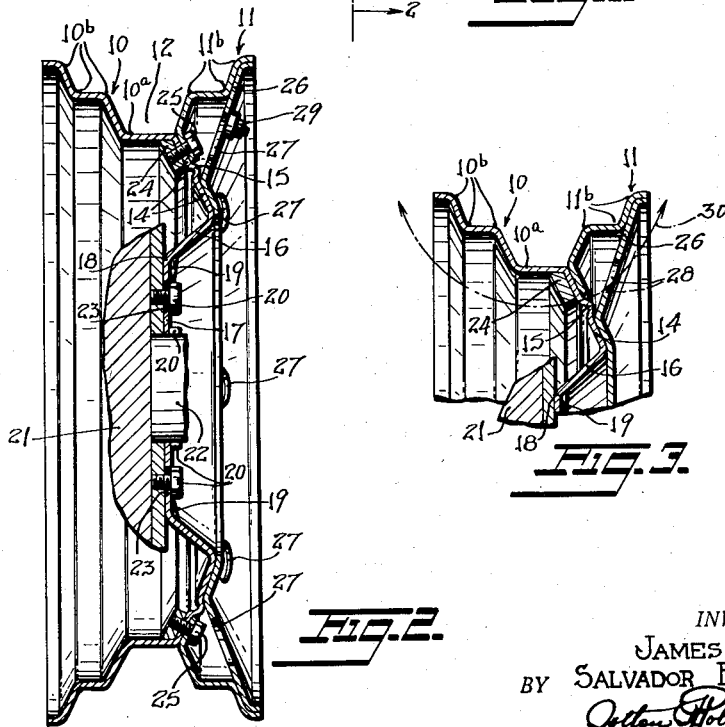
Fig. 2
Fig. 3
INVENTORS
JAMES SOLER
BY SALVADOR BALSELLS
ATTORNEY Patented Aug. 19, 1952

2,607,393

UNITED STATES PATENT OFFICE 2,607,393

AUTOMOBILE TIRE RIM

James Soler and Salvador Balsells,
Brooklyn, N. Y.

Application March 28, 1949, Serial No. 83,793

1 Claim. (Cl. 152—405)

This invention relates to new and useful improvements in tire-carrying rims of the so-called separable type, as, in the case for instance of automotive vehicles, for holding an inflatable and replaceable pneumatic tire; and, more particularly, the aim is to provide a novel and valuable such rim, with an accompanying improved wheel construction especially in the vicinity of the rim, said rim being of the kind having a rim portion partly consisting of a main annular rim member providing a bottom wall formation and also one of the two side wall formations which establish the rim portion, and an auxiliary and complementary annular rim member providing the other of the two side wall formations for establishing the rim portion.

The improvements of the present invention are particularly well adapted for advantageous use in connection with disk vehicle wheels of pressed metal.

A fundamental object of the invention is to provide a simple and low-cost-of-manufacture structure, which may be of relatively light weight yet unusually strong and rugged, and in that connection to provide a wheel of the metal disk type especially formed to permit stress combatting flexures at certain locations and at the same time compensatingly locally fortified at other locations.

A further object of the invention is to provide a structure having all the advantageous features above recited, and wherein, nevertheless, ready access, as for tire repair or change, is afforded to the bolts or the like which when tightened act to hold a tire in place on the wheel as a result of a dependable coupling of said main and complementary rim members by said bolts; whereby in bad weather an anti-skid chain or equivalent may be conveniently detachably added; and whereby, in any case, access may always be conveniently had to the air-inflation valve of the tire.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 side elevationally illustrates a now favored embodiment of the invention.

Fig. 2 is a section taken through said structure, substantially on the line 2—2 of Fig. 1.

Fig. 3 is a fragmentary radial section, this taken substantially on the line 3—3 of Fig. 1.

Referring now to the drawings more in detail, the exemplifying structure pursuant to the invention as shown herein incorporates a separable or split rim comprising a main rim member 10 and a complementary and detachable rim member 11. These parts are so shaped that when coupled the rim 12 thereby established is of a cross-sectional characteristic in conformity with the cross-sectional shape of the inner annular portion of a standard pneumatic tire-shoe as clearly shown in Fig. 2 or 3.

The main rim member 10 integrally includes a bottom wall 10$^a$ and a side wall 10$^b$. The complementary rim member 11 includes a side wall 11$^b$. Thus the elements 10$^a$ and 10$^b$ provide the bottom wall and one of the side walls respectively of the rim 12, and the element 11$^b$ provides the other side wall of the rim.

Further integrally included in the main rim member 10 is a conically annular portion 14, offset inwardly from the rim bottom wall 10$^a$; and this annular portion 14 is interrupted at about midway across its width by an outwardly struck channel or bead 15 of circular continuity and concentric with said bottom wall. Said annular portion 14 at its limit of lesser diameter merges, at an angle substantially slightly greater than 90°, into a further inward reversely conically annular portion 16; and the last-named annular portion at its limit of lesser diameter merges into a uniplanarly extended terminal annular portion 17.

In addition to the fortifying function of the channel or bead 15, this having another and an emergency function as will later be explained, the main rim member 10, at its annular line of bend 18 between its portions 16 and 17, is buttressed or locally stiffened by a circularly spaced series of blisters 19; one of such blisters adjacent to each of the locations of bolt-shank-passing apertures each individual to one of the several bolts or headed studs 20 shown. In the present case, six of these bolts are illustrated as present, spaced equidistantly and hence with each displaced by 60° from an immediately adjoining one; which bolts are provided for attaching the main member of the rim structure to the central main body or hub 21 of the wheel for taking an axle 22. Desirably, also, the portion 17 of the said main member 10, at and adjacent to the locations of said apertures, is thinned at its inner side, as indicated at 23.

The auxiliary rim member 11, it will be noted, inwardly terminates in a forwardly outwardly conically extended annular flange the bottom limit of which abuts the channel or bead 15; thus providing another function for the latter, but with this function, however, additional to the emergency function above mentioned.

Within the main rim member 10 is a ring-bar reinforcement 24, of the uniform cross-section all around the same illustrated, and preferably permanently attached to said main member as by spot-or-shot-welding. At 25 are shown eight bolts, these for being tightened to establish the rim 12 following mounting of a tire in the latter; said ring-bar being drilled and tapped, according to centers 45° apart, for threadedly taking the shanks of the bolts 25.

A sheet-form annular reinforcement 26 is carried by the complementary rim member 11; and may be secured thereto in any suitable manner or it may be permanently attached, as by spot-or-shot-welding. At points conforming to the locations of the bolts 25 and their tapped receiving holes through the rim-reinforcement 24, the reinforcement 26 is apertured as indicated at 27. This reinforcement 26 is also provided with four slots 28, with the centers thereof spaced 90° apart; and said reinforcement 26, and also the complementary rim member 11, are matchingly apertured at 29 for protrusion therethrough of the inflation-valve of the tire.

The apertures 27 are for permitting the use of the usual hand-wrench, in loosening and tightening the eight bolts 25. The slots 28 allow for easy application of the several cross-tie chain-members, such as the one indicated in dot and dash lines at 30 in Fig. 3, in adding, in bad weather, an anti-skid chain or the like.

While we have illustrated and described the preferred embodiment of our invention, it is to be understood that we do not limit ourselves to the precise construction herein disclosed and the right is reserved to all changes and modifications coming within the scope of the invention as defined in the appended claim.

Having thus described our invention, what we claim as new, and desire to secure by United States Letters Patent is:

Means mounting a complementary rim member forming one side of a tire rim on a main rim member including the bottom wall and other side wall of the rim, said mounting means comprising an outwardly directed conical portion continuing from the free edge of the bottom wall of the main rim member, a flange continuing from the inner edge of the complementary rim member and seated against the outer face of said conical portion, a ring-bar secured to the inner face of said conical portion at the junction of said conical portion with the bottom wall of the main rim member, means securing said flange to said conical portion and said ring-bar, and an outwardly pressed circumferential reinforcing bead formed in said conical portion immediately adjacent the free edge of said flange.

JAMES SOLER.
SALVADOR BALSELLS.

REFERENCES CITED

The following references are of record in the file of this patent:

UNITED STATES PATENTS

| Number | Name | Date |
|---|---|---|
| 1,382,672 | Racer | June 28, 1921 |
| 2,083,066 | Hunt | June 8, 1937 |
| 2,086,358 | Godfrey | July 6, 1937 |
| 2,209,803 | Webb | July 30, 1940 |
| 2,346,298 | Gulesian | Apr. 11, 1944 |